Sept. 3, 1946.  H. W. SEHER  2,406,968
PLATE WINDING MACHINE
Filed April 5, 1945  4 Sheets-Sheet 2
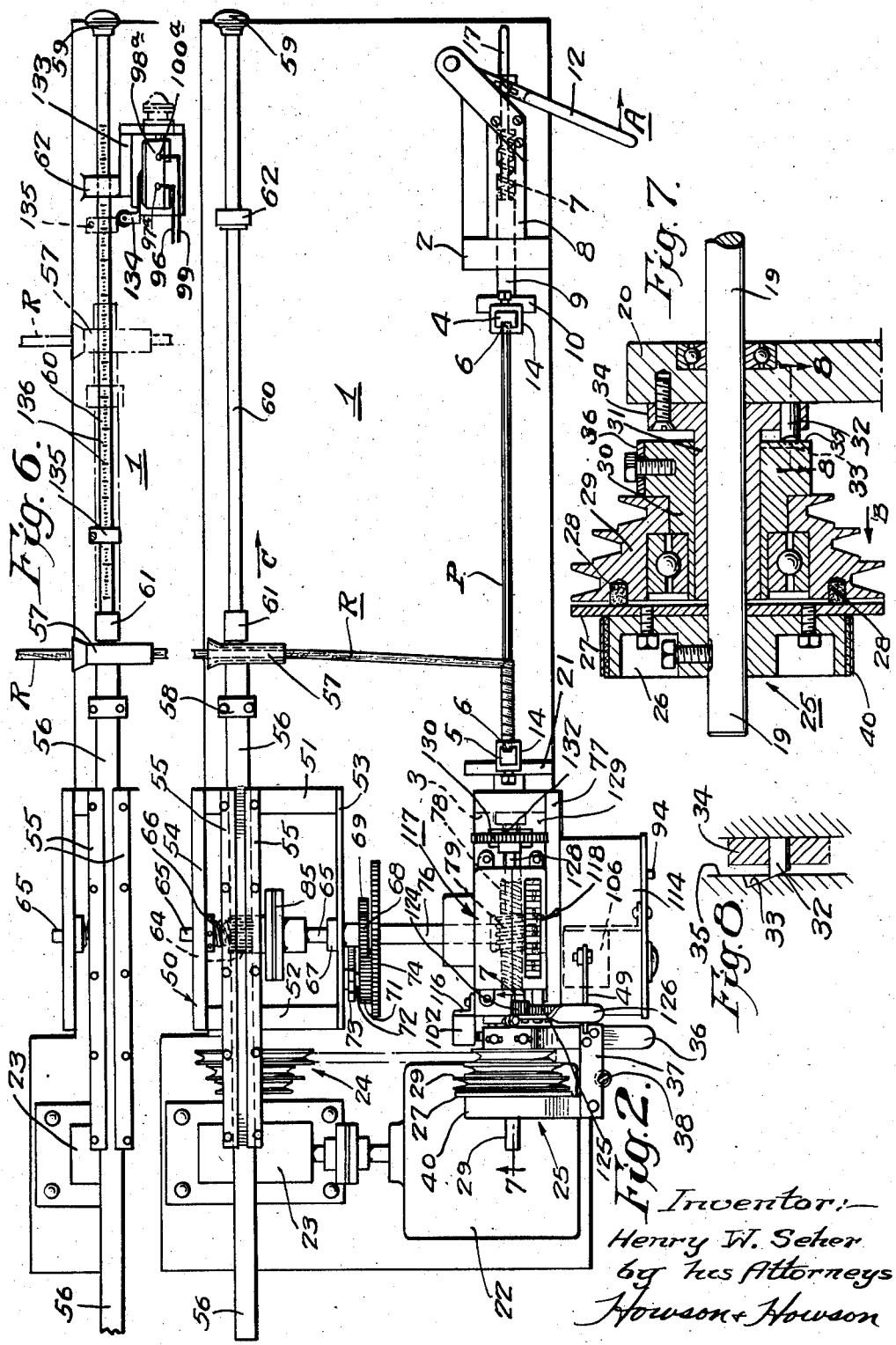
Inventor:—
Henry W. Seher
by his Attorneys
Howson & Howson

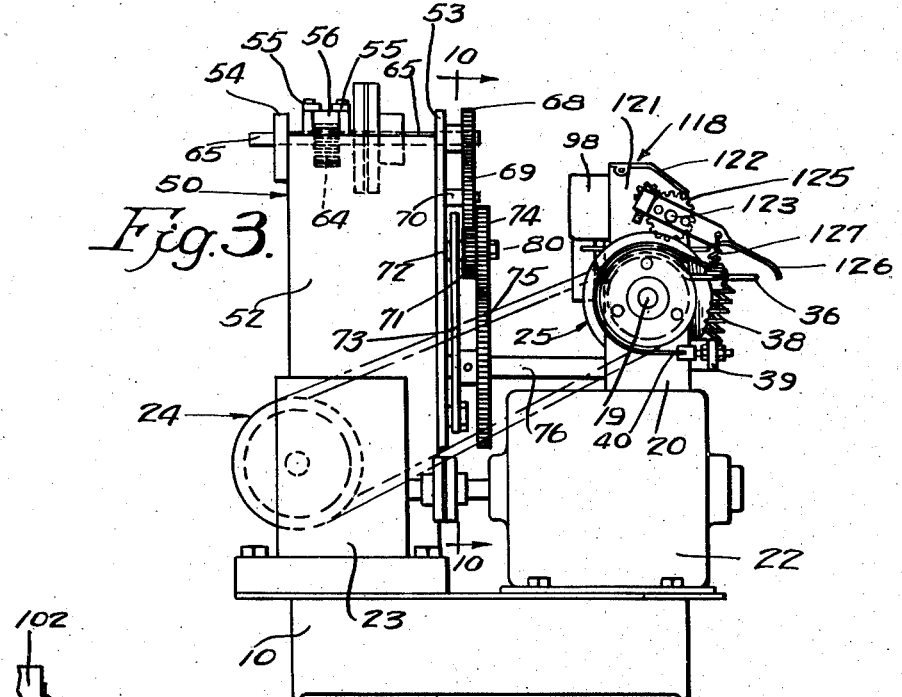
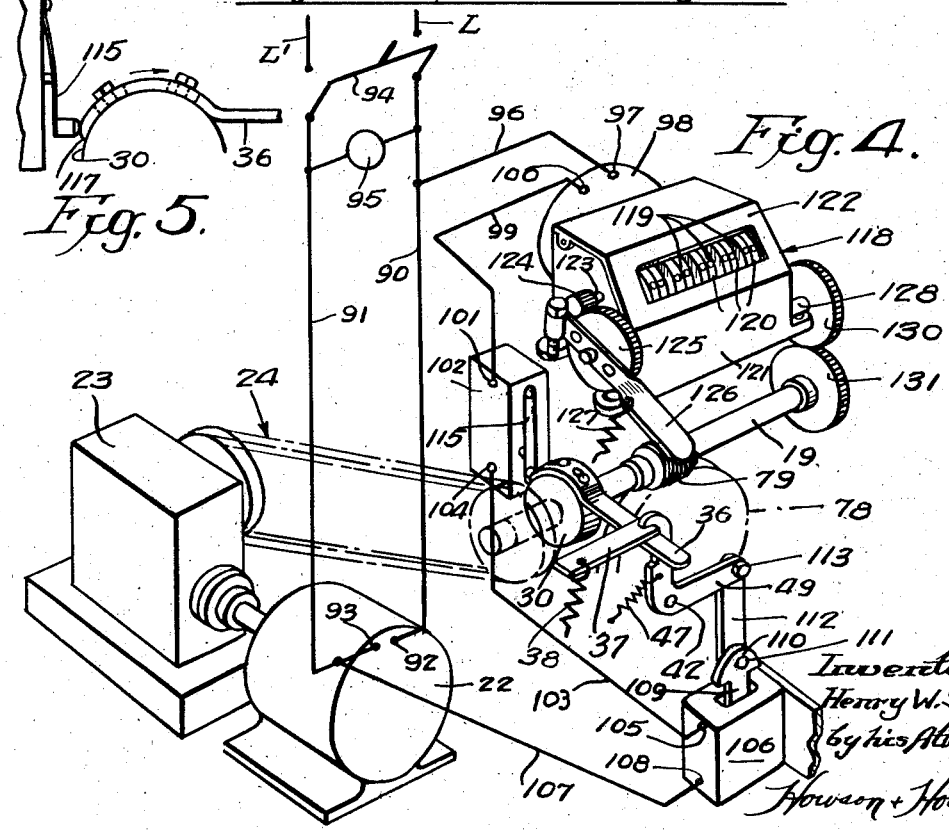

Sept. 3, 1946.   H. W. SEHER   2,406,968
PLATE WINDING MACHINE
Filed April 5, 1945   4 Sheets-Sheet 4

Inventor:—
Henry W. Seher
by his Attorneys
Howson & Howson

Patented Sept. 3, 1946

2,406,968

UNITED STATES PATENT OFFICE 2,406,968

PLATE WINDING MACHINE

Henry W. Seher, Elkins Park, Pa., assignor to Philco Corporation, Philadelphia, Pa., a corporation of Pennsylvania Application April 5, 1945, Serial No. 586,785

8 Claims. (Cl. 242—1)

The present invention relates generally to the manufacture of storage battery plates, and more particularly to plates of the type which are pasted or coated with an active substance and enclosed in a covering of suitable fibrous material, such as spun glass, to prevent the loss of the active substance from the plates. More specifically, the invention pertains to a machine for winding or swathing a ribbon-like fibrous material about the pasted plates.

In storage batteries of the lead acid type employing pasted plates, it is known that the electrodes suffer gradual loss of active material throughout the life of the battery. This effect is most serious in the case of the positive plates where the lead peroxide may exist in a somewhat granular or poorly cohesive state. During the charging period, bubbles of gas present in the interior of the positive plate and proceeding to the surface thereof may cause fine particles of the active material to be dislodged and to fall to the bottom of the container where the material accumulates as a sediment or "mud." Similarly, during discharge, the active material may be dislodged as a result of the chemical action accompanying the formation of lead sulphate, which occupies a greater volume than does the lead peroxide which it replaces. Generally, it may be said that active material is lost as a result of the various chemical reactions accompanying the charging and discharging of the battery. Physical motion of the battery, due to sudden jars or stresses, may also tend to dislodge particles of the active material. The immediate effect of this loss in active material is to seriously reduce the capacity of the battery as well as to shorten its life substantially.

According to a recent development in the manufacture of storage batteries of the type above referred to, the positive plates are wound or swathed, in both lengthwise and crosswise directions, with a relatively wide substantially flat ribbon consisting of strands of spun glass, with the adjoining convolutions in overlapped relation to insure a complete and even covering formed by longitudinal and transverse layers of minimum thicknesses. The effect of this treatment is to form about the positive plate an enclosure which is virtually impenetrable to the active material, while affording free access to the electrolyte. Experiments have proven that best results are obtained by using a ribbon in which the spun glass fibers or strands are disposed in a simple and generally longitudinal manner and are arranged so as to provide the ribbon with a central body portion of substantial thickness and edge portions gradually reducing in thickness. In this manner the adjoining edge portions of the successive wraps may be effectively overlapped to avoid open spaces between the wraps while the wraps themselves form a substantially smooth and uniform surface layer.

The wrapping of such a ribbon in the above-stated manner has been, heretofore, a tedious and lengthy operation requiring skilled and trained operators. Every wrap forming the covering surface layer must be laid on the battery plate in exact position so that the completed layers may be uniform in and between themselves and so that the several plates included in the storage battery may be of standard and uniform structure.

It is an object of this invention, therefore, to provide a machine which will lay and wrap the said ribbon accurately and in proper position about a storage battery plate without requiring particular skill nor special training on the part of the operator.

It is also an object of the invention to provide a machine capable of accurately and properly laying and winding the ribbon about a storage battery plate to form a substantially smooth and uniform protective covering therefor, the machine having means operable to control the laying and winding of the ribbon so that the number of wraps or convolutions forming such covering may be positively determined for plates of any given size, so that all the plates of the same size successively wound on the machine will have an identical structure, thereby making possible the production of standardized and uniform plates.

Another object of the invention is to provide a battery plate winding machine of the above-mentioned character, including means adjustable to wind the ribbon about plates having different lengthwise and crosswise dimensions, so that the same machine may be used to wrap plates of different sizes and in both lengthwise and crosswise directions.

Other objects and advantages of the invention will appear in the following description based upon the accompanying drawings, in which:

Fig. 2 is a top plan view of the machine;

Fig. 3 is an end view of the machine;

Fig. 4 is a semi-diagrammatic representation of the control mechanism of the machine;

Fig. 5 is an enlarged fragmentary detail of parts included in said control mechanism;

Fig. 6 is a top plan view of a portion of the machine, illustrating a modification in the construction of the control mechanism;

Fig. 7 is an enlarged cross-sectional view taken on line 7—7, of Fig. 2;

Fig. 8 is a sectional detail taken on line 8—8 of Fig. 7;

Figure 1:
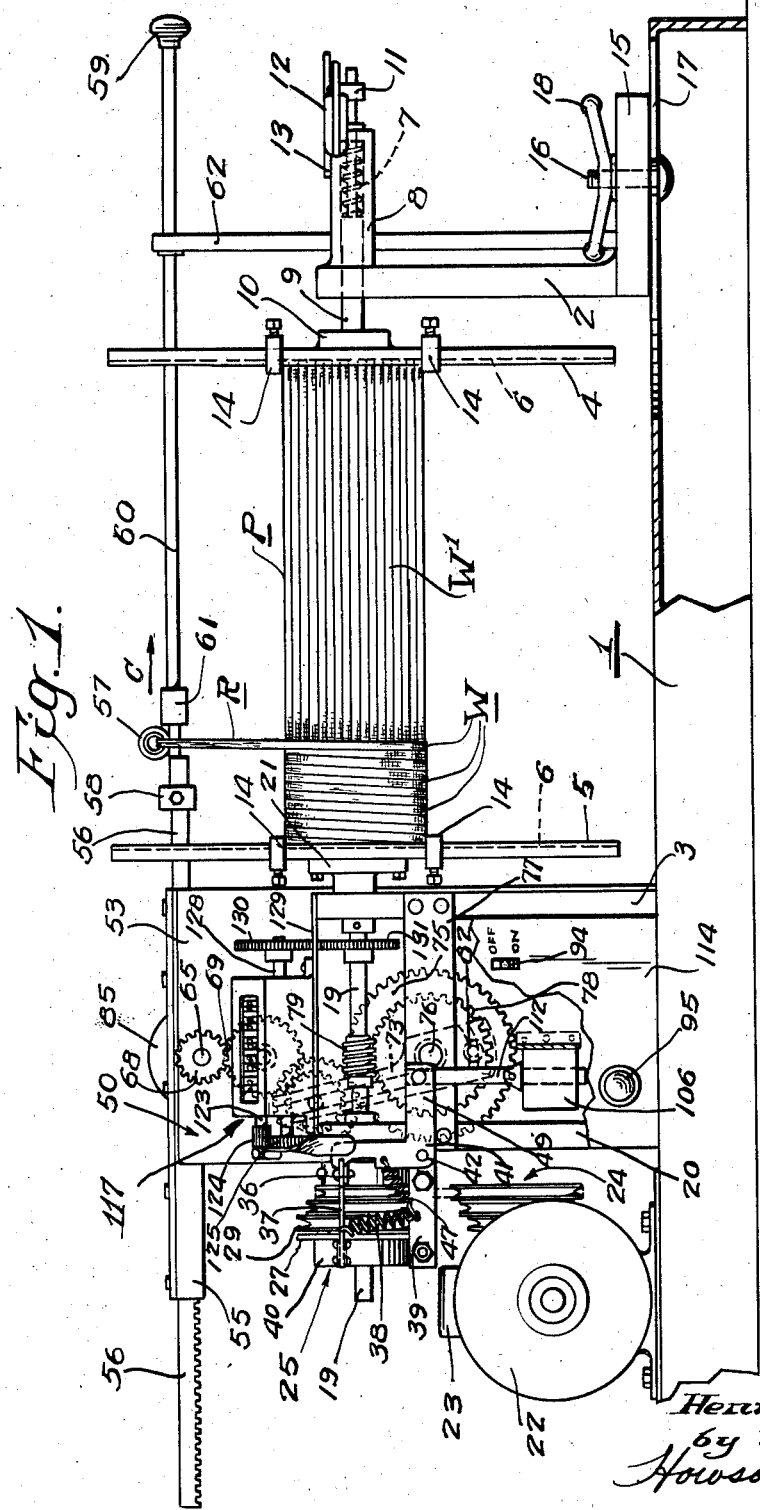
Fig. 1 is a front elevational view of the battery winding machine with portions broken away to illustrate certain parts more clearly.

With particular reference to the drawings, the battery plate winding machine as shown includes a base 1 which, in practice, may be supported at proper working height by means of any suitable structure such as a leg framework, work bench or the like. The base 1 may also be of any suitable construction and preferably has a plain rectangular table surface upon which the various cooperating mechanisms of the machine may conveniently be mounted, said mechanism including a battery plate holding and rotating mechanism, a traversing mechanism, and a control mechanism.

Broadly, the battery plate holding and rotating mechanism is adapted to accommodate plates of various standard lengths and widths. It includes battery plate clamping means and a power drive assembly operatively associated with said clamping means to impart rotation to the clamped plate about a central axis thereof, so that the same may be wrapped or swathed with ribbon-like fibrous material.

The traversing mechanism is devised to progress axially of the rotating battery plate for guiding and laying the ribbon-like fibrous material over said plate substantially at right angles to the rotational axis thereof. It is cooperatively associated with the plate holding and rotating mechanism to be driven in proper synchronism with the rotation of the battery plate clamping means, thereby positively governing the laying of the material in direct relation to the plate rotation which assures an exact positioning of the wraps or convolutions so as to form a smooth and even protecting surface layer completely covering the plate.

The control mechanism comprises electro-mechanical means capable of being set in accordance with the precise number of wraps needed to form the desired plate covering surface as aforesaid. It is intimately associated with the plate holding and rotating mechanism and with the traversing mechanism so that, upon completing the set number of wraps, the ribbon laying and wrapping functions of the machine are automatically interrupted.

In order that the invention may be thoroughly understood, the several mechanisms referred to, will be described in detail in the order stated, following which a summarized statement of their cooperative and correlated functions will be given.

*Battery plate holding and rotating mechanism*

Mounted on the surface of the base 1, at the forward portion thereof, are relatively spaced parallel standards 2 and 3, each rotatably supporting a battery plate engaging member, 4 and 5 respectively. As indicated more clearly in Figs. 1 and 2, the confronting faces of members 4 and 5 are slotted, as at 6, to receive the opposed edge portions of a battery plate P, whereby the latter may be clamped between said members for rotation about an axis above and longitudinally of the base 1. To this end, one member 4 is resiliently urged toward the other member 5 by means of a spring 7. This spring 7 is encased within a hollow extension 8 which projects laterally from the standard 2 and slidably receives a stub shaft 9, said shaft having at one extremity thereof a suitable bearing 10, such as a conventional roller bearing which, in turn, is connected to the battery plate engaging member 4. The other extremity of the stub shaft 9, which is preferably reduced in diameter to accommodate the spring 7, projects beyond the end of the extension 8 and is connected, as at 11, to a pivoted handle 12 carried by a bracket 13 on the said extension 8.

Because of this construction, it will be understood that movement of the handle 12 in the general direction represented by arrow A in Fig. 2, will cause the plate engaging member 4 connected to the stub shaft 9 to be displaced against the force of the spring 7 and away from the other plate engaging member 5, so that a battery plate may be inserted between said members. Upon release of said handle, the spring 7 will act to resiliently urge the member 4 toward the member 5, thereby securely clamping the inserted battery plate within the slots 6 in said members. The battery plate is held against sliding movement in the slots 6 by means of adjustable positioning elements 14 associated with the members 4 and 5 for abutting engagement with marginal edge portions of the battery plate.

Since battery plates are made in various sizes, the standard 2 which carries the rectractable battery plate engaging member 4 is preferably mounted on the base 1 for adjustment with respect to the other standard 3, the latter standard being fixed on said base. For that purpose the standard 2 is provided with a block 15 slidable on the base 1 and having a headed pin 16 which projects through an elongated slot 17 extending longitudinally in said base, the pin 16 being threaded for engagement with a tightening nut 18. It will be appreciated therefore that the adjustability of the standard 2 and of the positioning elements 14 renders the machine adaptable for the accommodation of battery plates of different sizes.

The battery plate engaging member 5 is rotatably supported in the fixed standard 3 by means of a rotatable drive shaft 19 having one end portion extending through said standard and the other end portion extending through an upright support 20 fixed to the base 1 in parallel spaced relation to the said standard 3. The end portion of the drive shaft 19 which projects from the standard 3, carries a coupling hub 21 which is rigidly connected to the battery plate engaging member 5. From the foregoing it will be understood that rotation of the drive shaft 19 will impart rotation to the battery plate P clamped between the rotatably mounted plate engaging members 4 and 5.

As illustrated in the drawings, the drive shaft 19 is rotated through the medium of a power drive assembly which includes an electric motor 22, a reduction gearing unit 23 of suitably known construction, a belt and pulley drive 24, and a combination power transmitting clutch and friction brake device 25, the latter being constructed to govern the rotation of the shaft 19 and therefore the rotation of the battery plate supported between the members 4 and 5.

Referring particularly to Fig. 7, the end portion of the drive shaft 19 which projects from the upright support 20, has a drum 26 secured thereto. The drum 26 is provided with a clutch plate 27 which is disposed for engagement with friction means 28 carried by a pulley 29, said pulley being a part of the belt and pulley drive 24. The pulley 29 is rotatably mounted on a bearing structure 30 which is received freely upon a sleeve 31 fixed to the shaft support 20 concentrically with the drive shaft 19. It is to be noted that the bearing structure 30 and the pulley 29, as a unit, are slidable on the sleeve 31 toward and away from the clutch plate 27, so that when pressure is applied to the bearing and pulley unit in the direction indicated by arrow B in Fig. 7, the friction means 28 will firmly contact the clutch plate 27 thereby imparting the rotary motion of the pulley 29 to the shaft 19 through said clutch plate 27 and drum 26.

In the construction shown, the necessary pressure may be applied to the bearing and pulley unit by way of cam-ended projections such as represented at 32, and cooperating cam-faced surfaces such as represented at 33 (see Figs. 7 and 8). Preferably, these projections and surfaces are in the form of pins and recesses, respectively, the pins being fixed, for instance, in a flange portion 34 of the sleeve 31, and the recesses being formed in the facing portion 35 of the freely mounted bearing structure 30, so that by rotating said structure counter-clockwise on the sleeve, the interengaged cam-ended pins and cam-faced recesses will coact to slide the bearing and pulley unit axially to effect clutch engagement between the friction means 28 and clutch plate 27. A lever 36 is suitably fixed to the bearing 30 so that upon manually lifting said lever the bearing structure is actuated as above described. This lever 36 is provided with an extension 37 (see Figs. 1 and 2) to which is connected one end of a spring 38 having its other end connected to a frame extension 39 (see Figs. 1 and 3), so that the lever 36 is normally pulled downwardly thereby urging the bearing in clockwise and clutch-disengaging direction.

As more clearly seen in Fig. 3, a friction brake band 40, having one end connected to the frame extension 39 and the other end connected to the lever extension 37, is arranged to partially surround the drum 26. Thus, the brake band 40 is capable of selectively and automatically locking or releasing the rotatable drive shaft 19, and with it the rotatably supported battery plate, in timed relation with the clutch disengaging and engaging movements. In other words, since the brake band 40 is connected to the extension 37 and is therefore under control of the clutch actuating lever 36, it will be apparent that the brake becomes effective to lock the battery plate drive shaft 19 when the said lever is lowered to disengage the clutch, but that the brake becomes ineffective and therefore releases or frees said shaft when the lever is raised into position to effect engagement of the clutch.

In order to hold the lever 36 in raised position against the downward pull of the spring 38, there is provided a bell crank-shaped trip latch 41 (see Fig. 1) pivoted as at 42 so that one branch of said latch may extend upwardly while the other branch is in a substantially horizontal position as shown in Fig. 1.

Figure 9:
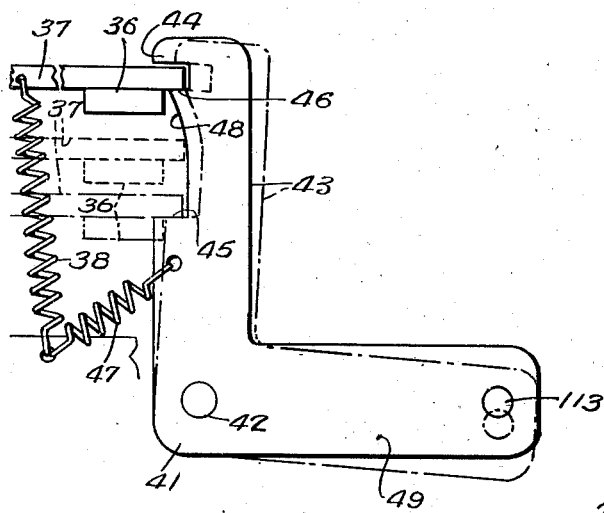
Fig. 9 is an enlarged detail illustrating the construction and operation of the trip latch incorporated in the machine.

The construction and function of this trip latch 41 will be better understood by reference to Fig. 9. As illustrated, the upwardly extending branch 43 of the latch is shaped to provide portions for limiting the upward and downward movements of the lever 36 as well as for holding said lever in its elevated position. To this end, the mentioned branch 43 of the trip latch has a part cut away to form an upper stop 44, a lower stop 45, and an intermediate latching element 46. It will be noted that the branch 43 of the trip latch is yieldably urged into constant edgewise engagement with the lever 36 by means of a spring 47, and that the edge of said latch immediately below the latching element 46 is curved thus forming a cam surface 48 whereby said lever 36, in moving from the lower stop 45 toward the upper stop 44, will deflect the latch as indicated in broken lines in Fig. 9. In this manner, the lever 36 is permitted to slip past the latching element 46 whereupon the latch bodily returns to its normal position thus holding said lever in raised position, as represented in full lines in said Fig. 9. From this figure, it will also be seen that when the lever 36 is held in raised position by reason of its engagement with the latching element 46, and a pivotal movement is imparted to the trip latch 41 to displace the same to the position shown in broken lines, said latching element will clear the lever and allow it to drop to the lower position under action of the spring 38. Pivotal movement of the latch to release the lever 36 may be imparted by depressing the horizontal branch 49 of said lever. Such depression may be accomplished either manually or by function of the control mechanism to be described hereinafter.

*Traversing mechanism*

Mounted upon the base 1 at the rearward portion thereof and disposed substantially in alignment with the structure which includes the standard 3 and support 20, is an upstanding framework 50, said framework consisting of side plates 51 and 52, a front plate 53, and a rear cross bar 54. Supported across the top of the side plates 51 and 52 are guides 55 adapted to slidably retain a rack bar 56 to which is fixed a tube-like member 57 arranged to deliver the ribbon R to the battery plate P as the rack bar travels in the direction of arrow C, that is, toward the right from an extreme left hand position, as viewed in Figures 1 and 2. This extreme left hand position may be determined by means of a stop 58 adjustably disposed on the rack bar 56 to abut the side plate 51 (see Fig. 2) when the said bar is moved to the left. In the construction as shown, movement of the rack bar to the left is accomplished manually, and for that purpose, there is a knob 59 provided at the free end of a push rod 60 which is connected, as by means of a coupling 61, to the rack bar 56 to form a continuation of the latter. The rack bar is stabilized and is slidably supported in a post 62 erected on the base 1.

It is to be noted that the location of the post 62 and the adjustment of the stop 58 are such that the ribbon-delivering tube or guide member 57 on the rack bar 56 is free to traverse the full distance between the battery clamping members 4 and 5 when the latter are adjusted to the greatest possible distance from each other, so that the ribbon R may be laid over the full area of the battery plate P.

As above stated, the ribbon R is delivered to the battery plate P as the rack bar 56 travels from its extreme left hand position toward a right hand position. This is accomplished in timed relation with the rotation of the battery plate by means of a gear arrangement now to be described.

As more clearly shown in Figs. 2 and 3, the rack bar 56 is engaged by a pinion 64 fixed on a shaft 65 which extends transversely of the framework 59 and is supported (see Fig. 2) in an adjustable thrust bearing 66 and in a suitable bushing 67 mounted respectively on the back cross bar 54 and the front plate 53 of said framework. The end portion of the shaft 65 which is supported by the front plate 53, protrudes through said plate and has secured thereon a second pinion 68 which meshes with an idling gear 69 carried by said plate as shown at 70 (Fig. 3). This idling gear 69 in turn meshes with a pinion 71 which is rigidly connected to an axle 72 rotatably upheld in a bracket 73. A gear 74, also rotatably connected to the axle 72, is disposed for meshing engagement with a gear 75 on a driven shaft 76 which extends transversely of the machine between the front plate 53 of the framework 59 and a tie plate 77 secured to the front edges of the standard 3 and support 20 (Fig. 1) which carry the battery plate drive shaft 19. The driven shaft 76 carries a second gear 78 for meshing engagement with a worm gear 79 fixed on the battery plate drive shaft 19 to rotate with the latter.

It will be appreciated that because of the gear arrangement described above, the traversing motion of the tube member 57, which lays the ribbon on the battery plate, and the rotating motion of said plate, which causes the wrapping of the ribbon thereabout, take place in synchronized relationship, and, in accordance with the invention, the gear arrangement is such that the rate at which the guide tube member traverses and the rate at which the battery plate rotates are positively related. As a result, the ribbon, when layed and wrapped about the plate, becomes located in exact position to assure that the relatively thin edge portions of said ribbon precisely overlap to an extent precluding possibility of spaces between adjoining wraps and affording a substantially even surface layer of desired thickness.

Moreover, the present invention provides for adjustment of the traversing speed of ribbon guide member 57 with respect to the ribbon winding speed of the battery plate P in accordance with the width of the particular ribbon being used or the amount of overlap required to obtain the desired thickness in the layer wound on the battery plate.

Figure 10:
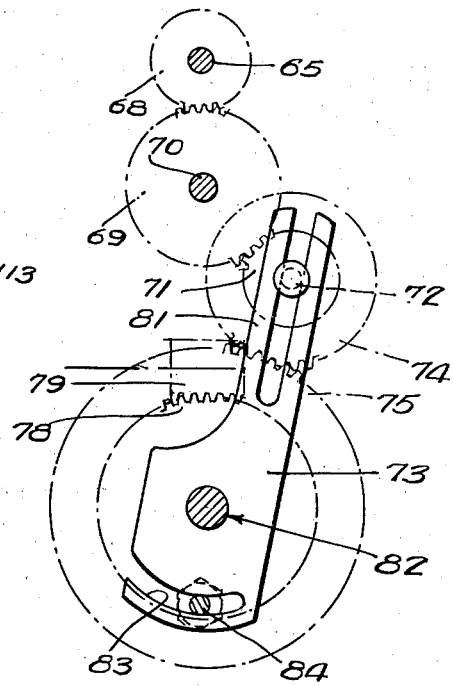
Fig. 10 is a semi-diagrammatic view on an enlarged scale, of the gear arrangement looking in the general direction of arrows 10—10 in Fig. 3.
Figure 11:
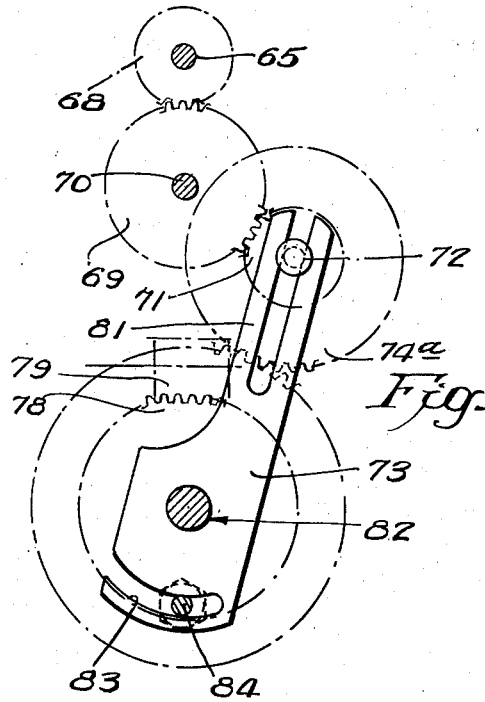
Fig. 11 is a view similar to Fig. 10 but showing the adjustability and function of the driven gear support.

In the construction shown, variations in the traversing speed of the member 57 are obtained by changing the ratio between the driving and driven gears of the gear arrangement hereinbefore described. This gear arrangement is such that the change in ratio may be obtained, within reasonable limits, simply by interchanging a single gear, namely, the main driven gear 74. For that purpose, the gear 74 is detachably mounted on the axle 72 by means of a lock nut 80 (Fig. 3). Furthermore, as more clearly seen in Figs. 10 and 11, the bracket 73 upholding the axle 72 is provided with bifurcated portion 81 along which the axle may slide. The bracket is pivoted at its intermediate portion, as shown at 82, in axial alignment with the driving gear 75, and terminates with a slotted end portion 83 through which extends a suitable fastening element such as a screw or bolt 84. With a construction of this kind, as will clearly appear from a comparison of Fig. 10 with Fig. 11, the driven gear 74 (Fig. 10) may be removed from the axle 72 and replaced by another gear of a different size, for instance a larger gear 74a (Fig. 11), and the bracket 73 adjusted so that said gear 74a and the pinion 71 on said axle properly register and mesh with their respective companion gears 75 and 69.

Thus, if a change is made from one ribbon to a ribbon of different width, or if more or less overlapping of the wraps is desired, the machine may be readily adjusted accordingly, by selecting and installing the proper size driven gear in the manner above described. It is to be understood that in practice the required set of interchangeable gears may be supplied with the machine to satisfy the expected requirements of the user.

As previously mentioned, the rack bar 56 and ribbon guide member 57 associated therewith may be moved manually by means of the push rod 60 toward the left of the machine, as viewed in Figs. 1 and 2, in order to return the guide member to an initial extreme left hand position. For that purpose, the shaft 65 which carries both the rack bar engaging pinion 64 and the pinion 68 which is connected to the drive shaft 19 through idler 69, pinion 71 and gears 74, 75, 78 and 79, is formed into two sections, and a slip-clutch 85 of any suitable construction is interposed between and connected to said sections. In this manner, the rack is free to be moved manually without imparting rotation to the gear connection between said shafts.

*Control mechanism*

In accordance with the invention, a control mechanism is provided which may be set to automatically cause cessation of the ribbon traversing and wrapping functions of the machine when the predetermined number of wraps required to cover the battery plate has been completed. This control mechanism consists of an electro-mechanical system which is shown more fully in Fig. 4 of the drawings. The electrical portion of the system includes a primary circuit for supplying electrical energy to the motor 22, and a secondary circuit for controlling the operation of the machine as and for the purpose above stated.

As can be seen in Fig. 4, the primary circuit comprises a pair of conductors 90 and 91, respectively, connected to the motor terminals 92 and 93 and including a manually operable main switch 94 for electrically connecting the motor with the supply lines L and L'. Preferably, a pilot light 95 is interposed in the primary circuit across the conductors 90 and 91 to give visual indication when the switch is closed. The secondary circuit comprises: a line 96 electrically connected to the conductor 90 of the primary circuit and to one terminal 97 of a mechanically operable master switch 98; a line 99 connected to the other terminal 100 of said master switch 98 and to one terminal 101 of a mechanically operable auxiliary switch 102; a line 103 connected to the other terminal 104 of said auxiliary switch 102 and to one terminal 105 of a solenoid coil 106; and, a line 107 connected to the other terminal 108 of said coil 106 and to the other primary circuit conductor 91, thus completing the secondary circuit.

A core 109, associated with the solenoid coil 106, has its upper end 110 pivotally attached, as at 111, to a link 112. This link in turn is pivoted, as at 113, to the substantially horizontal branch 49 of the trip latch 41 which, as previously stated, is adapted to selectively lock or release the lever 36 governing the actuation of the combination clutch and brake device 25. It will be apparent, therefore, that, when the solenoid coil 106 is de-energized, the core 109 is drawn upwardly in said coil by action of the spring 47 connected to the trip latch 41, and that, when the solenoid coil is energized, the core 109 is pulled downwardly in said coil thereby rocking said trip latch against the force of the spring. In this manner, when the latch 41 engages the lever 36 and the solenoid 106 is energized, said latch will be actuated to release the lever 36 for simultaneously applying the brake and releasing the clutch, said brake and clutch being associated with the shaft 19 as hereinbefore described.

In practice, the main switch 94, pilot light 95, solenoid coil 106 and most of the wiring are arranged conveniently in a suitable box 114 (see Figs. 1 and 2) located in a readily accessible part of the machine.

The energization and de-energization of the solenoid coil 106 are controlled through the function of the mechanically operable master and auxiliary switches 98 and 102. The auxiliary switch 102 is preferably a micro-switch of known construction. It is normally open and is closed by depressing an actuating spring member 115. As will more clearly appear from Fig. 2, this micro-switch is supported by a bracket 116 so that the switch actuating member 115 (see Figs. 4 and 5) lies in the path of movement of the fastened end of the brake and clutch control lever 36. This end of the lever 36 is provided with a cam surface 117 as particularly illustrated in Fig. 5. The cam surface 117 is adapted to engage and depress the micro-switch actuating member 115, thus closing the switch 102 when the lever 36 is in its raised position as shown, and to disengage and free said member 115, thus opening said switch when the lever is moved in the direction of the arrow in Fig. 5 to its lower position. Therefore, when the solenoid 106 is energized to actuate the trip latch 41 for releasing the brake and clutch control lever 36, current to said solenoid will be interrupted immediately following such release although the mechanically operable master switch 98 is closed.

In the form shown, particularly in Figs. 1 through 4, this mechanically operable master switch 98 is associated with a counter 118 of a well-known construction. Such a counter, which, per se, forms no part of this invention, is adapted to be set to any desired number within its capacity and to close the switch associated therewith when that number is reached.

As may best be seen in Fig. 4, the counter has two distinct sets of figure wheels, one set of wheels 119 being the predetermining wheels, and the other set of wheels 120 being the counting wheels. The switch operating elements including the sets of wheels 119 and 120 are enclosed in a housing 121, a hinged cover 122 being provided to give access to said housing for the manual setting of the predetermining wheels 119 to the desired predetermined number. The counting wheels 120 may be set to "zero" position by the clockwise rotation of a shaft 123 extending outside the housing 121. For that purpose, the extended position of said shaft 123 is provided with a pinion 124 enmeshed with a toothed member 125 fixedly carried by a pivotal lever 126, so that, upon manually lifting said lever, the shaft 123 is actuated to return the counting wheels to "zero." The lever 123 is returned to the lowered position by means of a spring 127 without disturbing the wheel setting.

In operation, the counting wheels 120 are advanced by rotation of a shaft 128 until said wheels reach the predetermined number as selected by the manual setting of the predetermining wheels 119. Upon reaching this set predetermined number, the master switch 98, associated with the counter 118, closes and remains closed until the counting wheels 120 are returned to the "zero" position by manipulation of the lever 126.

In accordance with the present invention, the counter 118 is utilized to count the number of ribbon wraps or turns which are required to cover the battery plate being wound on the machine, and to close the secondary circuit, thus energizing the solenoid 106, when such required number of wraps has been applied to the plate. To this end, the counter 118 is mounted upon a supporting plate 129 (see Fig. 1) on the standard 3 and support 20 and the counter driving shaft 128 is provided with a gear 130 disposed for meshing engagement with a gear 131 fixed on the battery plate drive shaft 19. Meshing engagement between the gears 130 and 131 is permitted by a suitable aperture 132 (see Fig. 2) in the supporting plate 129. The gears 130 and 131 are in the order of a one to one ratio, so that the counter is advanced by one digit for each revolution of the shaft 19 which causes the formation of one complete wrap about the battery plate.

Thus, it will be understood that by setting the predetermining wheels 119 to register, on the counter, the predetermined number of wraps which are required to cover the battery plate, the ribbon traversing and winding functions of the machine may be interrupted when that number of wraps is completed.

A modified form of control mechanism is shown in Fig. 6. This modified form eliminates the predetermining counter 118 associated with the mechanically operable master switch 98 and substitutes a master switch 98a which preferably is a micro-switch similar in construction to the auxiliary switch 102. This master micro-switch 98a is connected, as at 97a and 100a (Fig. 6), to the lines 96 and 99 which, as shown in Fig. 4, are respectively connected to one conductor 90 of the primary circuit and to one terminal 101 of the auxiliary switch 102 in the secondary circuit and under control of the lever 36.

Moreover, in the modification shown in Fig. 6, the master micro-switch 98a is conveniently supported on the post 62 by means of a bracket 133, so that the depressible switch closing member 134 of said switch 98a lies in the path of movement of an actuating element 135 adjustably carried on the rod 60 which forms an extension to the traversing rack 56. The rod 60 is provided with a suitable scale 136 calibrated to afford convenient indexing means for locating the element 135 in accordance with the distance over which the ribbon-traversing guide member 57 must travel to deliver the ribbon to the battery plate in forming the number of wraps needed to cover the plate.

From the foregoing, it will be understood that, during operation of the traversing mechanism as hereinbefore described, the element 135 will travel from an extreme left hand position, as viewed in Fig. 6, towards a right hand position until said element engages the switch actuating member 134, as represented in broken lines in said Fig. 6. Engagement of said member by the element 135 actuates the master switch 98a to close the secondary circuit thereby energizing the solenoid in said circuit and accordingly interrupting the ribbon traversing and winding functions of the machine in the manner previously specified. It will be understood also that by properly locating the element 135 on the rod 30 with the aid of the calibrated scale 136, the interruption of the ribbon traversing and winding functions of the machine may be made to occur automatically upon completion of the predetermined number of wraps required to cover the plate.

*Use and operation of the machine*

In setting up the machine to suit the plates to be operated on, the proper size driven gear 74 is installed, the positioning elements 14 are adjusted on the battery plate engaging members 4 and 5, and the adjustable plate engaging member 4 is brought and locked into position with respect to the fixed plate engaging member 5. The master switch actuating counter 118 (Figs. 1 through 4) or element 135 (Fig. 6) may then be set to the desired number of turns, the traversing mechanism positioned to locate the ribbon guide member 57 in its extreme left hand position, and the ribbon R threaded through said member. Thus set, the machine is ready for use.

In using the machine, the battery plate is inserted between the positioning elements 14 and between the clamping members 4 and 5, the member 4 being first retracted and then released, for instance by manipulation of the lever 12 (Fig. 1) to permit insertion of the plate and subsequent tight clamping thereof between said members. The free end of the ribbon R is then attached in any suitable manner to the plate at a point in close proximity to the left hand clamping member 5. The machine may then be started.

In starting the machine provided with a counter control, the lever 126 is first manually lifted thus moving the counting wheels 120 to their "zero" position and opening the master switch 98 of the secondary circuit. If the machine is provided with a control in the form shown in Fig. 6, it will be understood that at the starting position of the machine, the secondary circuit master switch 98a is open since, in such position, the control element 135 is in the extreme left hand position and therefore out of contact with the switch actuating member 134.

With the secondary circuit master switch 98 or 98a open, the lever 36 may be lifted manually to its elevated position and held in that position by means of the trip latch 41. As hereinbefore stated, the lifting of the lever 36 to this position brings the friction means 28 into snug engagement with the clutch plate 27, releases the brake band 40 and closes the auxiliary switch 102 included in the secondary circuit between the master switch 98 or 98a and the solenoid 106. Thus, the main switch 94 in the primary circuit being closed and the motor 22 energized, power is transmitted to the drive shaft 19 thereby rotating the battery plate P and simultaneously traversing the ribbon guide member 57 through the gear arrangement as hereinbefore described, so that the ribbon R is properly and evenly laid on the plate to form accurately overlapping successive wraps axially of the plate. The ribbon traversing and winding continues until the predetermined number of wraps necessary to cover the plate is completed, such predetermined number of wraps corresponding to the setting of the counter 118 (Figs. 1 through 4) or of the control element 135 (Fig. 6). When the predetermined number of wraps is completed, the counter 118 or element 135 acts to close the secondary circuit master switch 98 or 98a, thereby energizing the solenoid 106, tripping the latch 41 and releasing the lever 36 to apply the brake and disengage the clutch of the combination brake and clutch device 25 and to arrest the ribbon winding and traversing functions of the machine. The motor 22 may continue to run. The tripping of the latch 41 to release the lever 36 also causes the auxiliary switch 102 to open, so that current through the solenoid coil 106 is cut off almost instantaneously following the tripping action. In this manner, although the master switch of the secondary circuit is closed, the solenoid is de-energized practically as soon as it has served its purpose, allowing trip 41 to return to position for the next cycle of operation.

After interruption of the ribbon traversing and winding functions of the machine, the ribbon R may be cut or broken and the wound plate removed by retracting the clamping member 4 as by manipulation of the handle 12. A new plate of the same or substantially the same size may then be placed on the machine with no other adjustment than the return of the traversing mechanism to initial position and the lifting of the levers 126 and 36. If for any reason it should become necessary to stop the machine during the winding operation, this can be accomplished by manually tripping the latch 41. In that event, the winding operation may be resumed merely by lifting the lever 36 to its elevated position.

From the foregoing, it will be apparent that the invention provides a battery plate winding machine particularly suited to the specialized work for which it is intended. It is adapted to handle a particular kind of ribbon, which has been found most advantageous and effective in forming a protecting covering for storage battery plates, and delivers and winds such ribbon in a manner to form properly overlapped wraps productive of the smooth and even layers required in a fully protective enclosure for the plates. The machine moreover is capable of being positively set and automatically controlled to produce the proper number of wraps for any particular plate wound on the machine. Particularly, the machine is capable of producing spun-glass ribbon wound battery plates of uniform and standard structure without special skill or training on the part of the operator.

It is to be understood that specific structural arrangements herein set forth may be modified within the scope of the claims without departing from the spirit of the invention.

I claim:

1. In a machine for winding a ribbon about a storage battery plate, battery plate holding and rotating mechanism, ribbon traversing mechanism mechanically associated with said holding and rotating mechanism and operable to lay the ribbon on the plate in timed relation with the rotation thereof to form overlapping wraps progressing axially of the plate, and control mechanism operatively related to said plate holding and rotating mechanism and to the ribbon traversing mechanism, said control mechanism comprising electro-mechanical means adapted to be set in accordance with the number of wraps to be formed on the plate and operable to terminate the ribbon winding and traversing functions of the machine upon completion of said number.

2. In a machine for winding a ribbon about a storage battery plate, battery plate holding and rotating mechanism including battery plate clamping means and a power drive assembly operatively associated with said clamping means to impart rotation to the clamped plate for wrapping said ribbon thereabout, ribbon traversing mechanism mechanically associated with said power drive assembly and operable to lay the ribbon in timed relation with the rotation of said plate upon the latter to form overlapping wraps progressing axially of the plate, and control mechanism operatively related to said plate holding and rotating mechanism and to the ribbon traversing mechanism, said control mechanism comprising electro-mechanical means adapted to be set in accordance with the number of wraps to be formed on the plate and operable to terminate the ribbon winding and traversing functions of the machine upon completion of said number.

3. In a machine for winding a ribbon about a storage battery plate, battery plate holding and rotating mechanism including battery plate clamping means and a power drive assembly operatively associated with said clamping means to impart rotation to the clamped plate for wrapping said ribbon thereabout, ribbon traversing mechanism mechanically associated with said power drive assembly and operable to lay the ribbon in timed relation with the rotation of said plate upon the latter to form overlapping wraps progressing axially of the plate, and control mechanism operatively connected with said power drive assembly and comprising electromechanical means adapted to be set in accordance with the number of wraps to be formed on the plate and operable to terminate the ribbon winding and traversing functions of the machine upon completion of said number.

4. In a machine for winding a ribbon about a storage battery plate, battery plate holding and rotating mechanism including battery plate engaging means and a power drive assembly having a drive shaft connected with said means to impart rotation to the plate for wrapping said ribbon thereabout, ribbon traversing mechanism including ribbon guide means movable to progress axially of the rotating battery plate to lay the ribbon onto the plate substantially at right angles to the rotational axis thereof, a gear arrangement between said drive shaft and guide means for moving the latter in synchronism with the rotation of the battery plate thereby controlling the laying of the ribbon in direct relation to the plate rotation to form overlapping wraps upon the plate, and control mechanism operatively related to said plate holding and rotating mechanism and to the ribbon traversing mechanism, said control mechanism comprising electro-mechanical means capable of being set in accordance with the number of wraps to be formed on the plate and operable to terminate the ribbon winding and traversing functions of the machine upon completion of said number.

5. In a machine for winding a ribbon material about a storage battery plate, battery plate holding and rotating mechanism including adjustable battery plate clamping means and a power drive assembly having a drive shaft connected with said clamping means to impart rotation to the clamped plate for wrapping said ribbon thereabout, ribbon traversing mechanism including ribbon guide means movable to progress axially of the rotating battery plate to lay the ribbon onto the plate substantially at right angles to the rotational axis thereof, a gear arrangement between said drive shaft and guide means for moving the latter in synchronism with the rotation of the battery plate thereby governing the laying of the ribbon in direct relation to the plate rotation to form overlapping wraps about the plate, said gear arrangement being adjustable to vary the traversing speed of said guide means with respect to the rotating speed of the plate, and control mechanism cooperatively related to said plate holding and rotating mechanism and to the material traversing mechanism, said control mechanism comprising electromechanical means capable of being set in accordance with the number of wraps to be formed on the plate and operable to terminate the ribbon winding and traversing functions of the machine upon completion of said number.

6. In a machine for winding a ribbon about a storage battery plate, battery plate holding and rotating mechanism including battery plate engaging means and a power drive assembly having a drive shaft connected with said means to impart rotation to the plate for wrapping said ribbon thereabout, ribbon traversing mechanism including ribbon guide means movable to progress axially of the rotating battery plate to lay the ribbon onto the plate substantially at right angles to the rotational axis thereof, a gear arrangement between said drive shaft and guide means for moving the latter in synchronism with the rotation of the battery plate thereby controlling the laying of the ribbon in direct relation to the plate rotation to form a layer of overlapping wraps covering the plate, and control mechanism comprising an electro-mechanical system including an electric circuit, means controlled by said circuit and mechanically associated with said drive shaft to interrupt the rotation thereof, and means operatively related to said plate holding and rotating mechanism and to the ribbon traversing mechanism to control said circuit for the actuation of the said interrupting means upon completion of said layer.

7. In a machine for winding a ribbon about a storage battery plate, battery plate holding and rotating mechanism including battery plate engaging means and a power drive assembly having a drive shaft connected with said means to impart rotation to the plate for wrapping said ribbon thereabout, ribbon traversing mechanism including ribbon guide means movable to progress axially of the rotating battery plate to lay the ribbon onto the plate substantially at right angles to the rotational axis thereof for forming a layer of overlapping wraps covering the plate, and control mechanism comprising an electro-mechanical system including an electric circuit, means controlled by said circuit and mechanically associated with said drive shaft to interrupt the rotation thereof, and means also mechanically associated with said drive shaft to control said circuit for the actuation of the said interrupting means upon completion of said layer.

8. In a machine for winding a ribbon about a storage battery plate, battery plate holding and rotating mechanism including battery plate engaging means and a power drive assembly having a drive shaft connected with said means to impart rotation to the plate for wrapping said ribbon thereabout, ribbon traversing mechanism including ribbon guide means movable to progress axially of the rotating battery plate to lay the ribbon onto the plate substantially at right angles to the rotational axis thereof for forming overlapping wraps covering the plate, and control mechanism comprising an electro-mechanical system including an electric circuit, means controlled by said circuit and mechanically associated with said drive shaft to interrupt the rotation thereof, and means mechanically associated with said traversing mechanism to control said circuit for actuation of the said interrupting means upon completion of said layer.

HENRY W. SEHER.